Patented Oct. 4, 1938

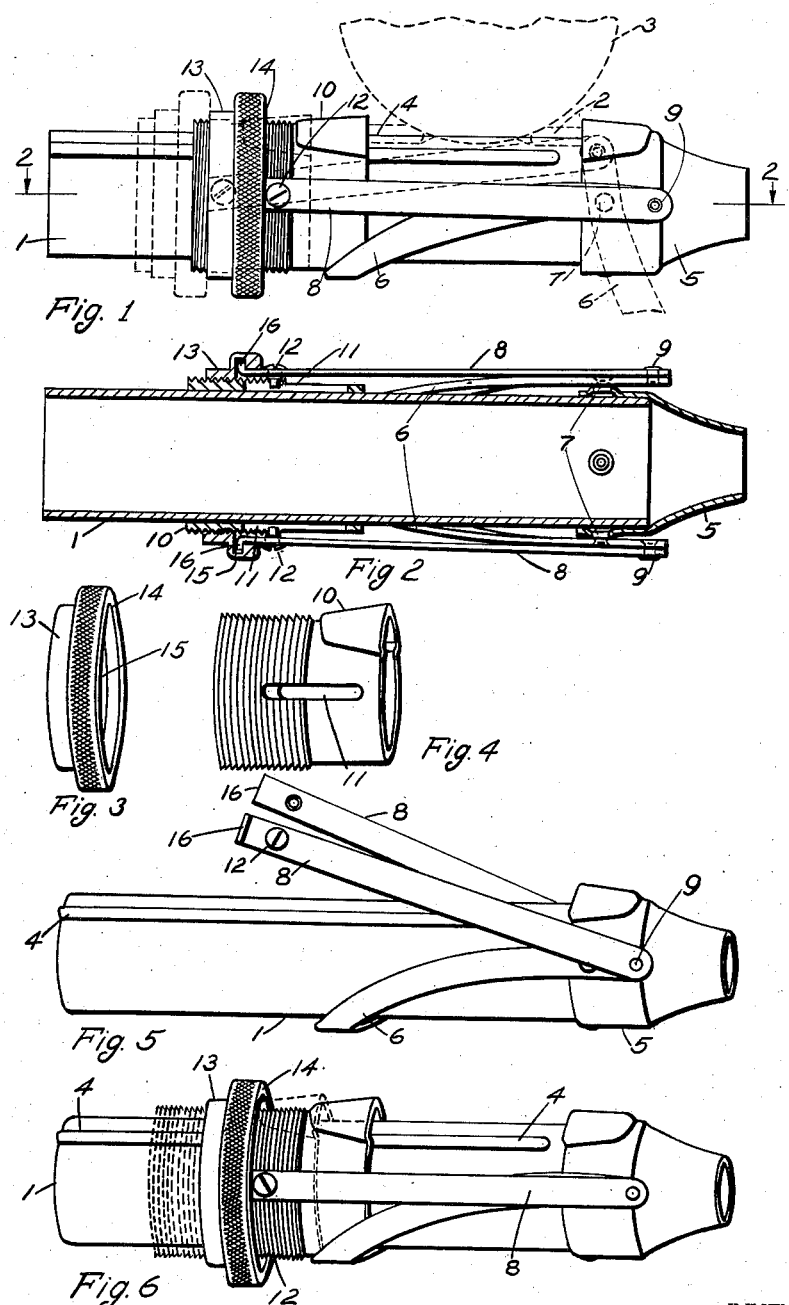

2,131,819

UNITED STATES PATENT OFFICE 2,131,819

REEL SEAT FOR FISHING RODS

Samuel G. Russell, Kalamazoo, Mich., assignor to Shakespeare Company, Kalamazoo, Mich., a corporation of Michigan Application March 15, 1937, Serial No. 130,805

13 Claims. (Cl. 43—22)

My invention relates to reel seats for fishing rods, and more particularly to that type disclosed by the patent to Ralph W. Miller, No. 2,027,243, patented January 7, 1936.

The main objects of my invention are:

1st, to provide a reel seat for fishing rods having improved means for accurately adjusting the effective spacing of the reel seat parts to accommodate reel seat plates of different sizes.

2nd, to provide a reel seat for fishing rods which is simple and economical in its parts and very efficient and effective in operation.

Objects pertaining to details and economies of my invention will definitely appear from the description to follow. The invention is defined in the claims.

A structure which embodies the features of my invention is clearly illustrated in the accompanying drawing in which:

Fig. 1 is a view in side elevation of a reel seat for fishing rods, the reel being indicated by dotted lines.

Fig. 2 is a view in longitudinal cross section taken on line 2—2 of Fig. 1.

Fig. 3 is a perspective view of the manually adjustable nut.

Fig. 4 is a perspective view of the movable clamp.

Fig. 5 is a perspective view of the non-adjustable parts.

Fig. 6 is a fragmentary perspective view of the reel seat, showing how the movable clamp may be adjusted.

Referring to the drawing, 1 is a fishing rod member adapted to receive the seat plate 2 of a reel 3, the rod member being provided with spaced longitudinal ribs 4 between which the reel seat plate fits. A stationary clamp 5 is adapted to receive one end of the reel seat plate. To the stationary clamp is pivoted a U-shaped lever 6 having its arms pivoted at 7 to opposite sides of the clamp. Links 8, 8 are disposed at opposite sides of the rod member and are pivotally connected at 9 to the ends of the lever arms.

I provide a movable clamp 10 adapted to engage the other end of the reel seat plate 2, this clamp having longitudinal slots 11, 11 at opposite sides thereof to receive studs 12, 12 threaded through the links 8. The studs are free to pivot in the slots without interfering with the longitudinal adjustment of the moving clamp relative to the links. Threaded on the movable clamp is a manually adjustable nut 13 provided with an annular flange 14 spaced from the movable clamp and having an internal annular groove 15, the flange 14 being externally knurled to facilitate the manipulation thereof.

The links 8 are provided with out turned end tongues 16, 16 coacting with the groove 15, so that the nut 13 is free to be rotated to adjust the longitudinal position of the clamp 10 thereunder. Thus, the effective spacing between the clamps 5 and 10 may be nicely adjusted by rotating the nut 13 to accommodate reel seat plates of different lengths, as shown by Fig. 6.

Once the effective spacing between the clamps is adjusted for a certain reel seat plate, the lever 6 may be operated to open and close the clamps to properly release and engage the reel seat plate, as desired, the lever 6 and links 8 providing a locking toggle for effectively holding the reel seat plate in place.

As indicated in dotted lines in Fig. 1, the lever 6 may be pulled to the dotted line position to cause the links 8 to likewise move to their dotted line position. This shifts the nut 13 and the clamp 10 to the left and continued movement of the several parts causes the nut and the clamp to assume their dotted line positions of Fig. 1.

It will be appreciated by those skilled in the art that I provide improved means for adjusting the clamps to accurately accommodate reel seat plates in a wide range of sizes. This is a highly desirable accomplishment owing to the strain to which the reel and rod member are subjected when in use. Further, my improvements are simple and economical, and very efficient and effective for the purpose intended.

I have not attempted to illustrate or describe other embodiments or adaptations of my invention, as it is believed that this disclosure will enable those skilled in the art to embody or adapt the same as may be desired.

Having thus described my invention, what I claim as new and desire to secure by Letters Patent is:

1. In a reel seat for fishing rods, the combination with a rod member adapted to receive the seat plate of a reel, a stationary clamp adapted to receive one end of the reel seat plate, and a U-shaped lever having its arms pivoted to opposite sides of said clamp, of a movable clamp adapted to engage the other end of the reel seat plate and having longitudinal slots in the opposite sides thereof, a manually adjustable nut threaded on said movable clamp and provided with an annular flange spaced from said movable clamp and having an internal annular groove, links disposed at opposite sides of said rod member and pivotally connected at one end to said lever arms, the other end of said links having tongues coacting with said groove, and studs threaded through said links for coaction with said slots so that the effective space between said clamps may be adjusted by rotating said nut to nicely accommodate reel seat plates of different lengths.

2. In a reel seat for fishing rods, the combination with a rod member adapted to receive the seat plate of a reel, a stationary clamp adapted to receive one end of the reel seat plate, and a U-shaped lever having its arms pivoted to opposite sides of said clamp, of a movable clamp adapted to engage the other end of the reel seat plate and having longitudinal slots in opposite sides thereof, a manually adjustable nut threaded on said movable clamp and provided with an annular flange spaced from said movable clamp and having an internal annular groove, links disposed at opposite sides of said rod member and pivotally connected to said lever arms, said links having tongues coacting with said groove, and studs on said links coacting with said slots so that the effective space between said clamps may be adjusted by rotating said nut to nicely accommodate reel seat plates of different lengths.

3. In a reel seat for fishing rods, the combination with a rod member adapted to receive the seat plate of a reel, a stationary clamp adapted to receive one end of the reel seat plate, and a U-shaped lever having its arms pivoted to opposite sides of said clamp, of a movable clamp adapted to engage the other end of the reel seat plate, a manually adjustable nut threaded on said movable clamp, links disposed at opposite sides of said rod member and pivotally connected at one end to said lever arms, means connecting said links and nut so that the nut is free to be rotated, and means connecting said links and movable clamp so that the movable clamp is free to be adjusted longitudinally of the links, the effective space between said clamps being adjusted by rotating said nut to nicely accommodate reel seat plates of different lengths.

4. In a reel seat for fishing rods, the combination of a rod member having spaced relatively movable clamps thereon adapted to receive the opposite ends of a reel seat plate, manually controlled means including links for opening and closing said clamps, and means for adjusting the effective spacing between said clamps, said last named means comprising a manually adjustable nut threaded on one of said clamps, means connecting said links to said nut so that the latter is free to turn, and means connecting said links to said last named clamp so that the latter is free to move longitudinally thereof, the rotation of said nut acting to change the longitudinal position of the clamp relative to the links.

5. In a reel seat for fishing rods, the combination of a rod member having spaced relatively movable clamps thereon adapted to receive the opposite ends of a reel seat plate, manually controlled means including links for opening and closing said clamps, and means for accurately adjusting the effective spacing between said clamps, said last named means comprising manually adjustable means threaded on one of said clamps, means connecting said links to said adjustable means so that the latter is free to turn, and means connecting said links to said last named clamp so that the latter is free to move longitudinally thereof, the rotation of said adjustable means acting to change the longitudinal position of the clamp relative to the links.

6. In a reel seat for fishing rods, the combination of a rod member having spaced relatively movable clamps thereon adapted to receive the opposite ends of a reel seat plate, means for opening and closing said clamps, and means for accurately adjusting the effective spacing between said clamps, said last named means comprising adjustable means threaded on one of said clamps, and means connecting said clamp opening and closing means to said last named clamp so that the latter is free to be adjusted longitudinally thereof, the rotation of said adjustable means acting to change the longitudinal position of the clamp relative to said opening and closing means.

7. In a reel seat for fishing rods, the combination with a rod member adapted to receive the seat plate of a reel, and locking toggle means associated with said rod member and including links disposed at opposite sides of said rod member, of a movable clamp adapted to engage one end of the reel seat plate, a manually adjustable nut threaded on said clamp, tongue and groove means connecting said links to said nut, and slot and stud means connecting said links to said clamp, the turning of said nut on said clamp acting to change the effective longitudinal position of said clamp on said rod member relative to said links.

8. In a reel seat for fishing rods, the combination with a rod member adapted to receive the seat plate of a reel, and locking toggle means associated with said rod member and including link means, of a clamp adapted to engage the reel seat plate, a manually adjustable member threaded to said clamp, tongue and groove means connecting said link means to said adjustable member, and slot and stud means connecting said link means to said clamp, the turning of said adjustable member on said clamp acting to change the effective longitudinal position of said clamp on said rod member relative to said link means.

9. In a reel seat for fishing rods, the combination with a rod member adapted to receive the seat plate of a reel, and locking toggle means associated with said rod member, of clamp means adapted to engage the reel seat plate, manually adjustable means threaded to said clamp, tongue and groove means connecting said toggle means to said adjustable means, and slot and stud means connecting said toggle means to said clamp, the turning of said adjustable means on said clamp acting to change the effective longitudinal position of said clamp on said rod member relative to said toggle means.

10. The combination with a clamp for the seat plate of a reel, of a manually adjustable nut threaded on said clamp and having an externally knurled flange provided with an internal annular groove, a link having an out-turned end tongue extending into said groove, said clamp having a longitudinal slot therein, and a stud threaded through said link and slidably and pivotally coacting with said slot so that the longitudinal position of said clamp relative to said link may be changed by rotating said nut.

11. The combination with a clamp for the seat plate of a reel, of a manually adjustable member threaded to said clamp and having an externally knurled flange provided with an internal annular groove, a link having a tongue extending into said groove, said clamp having a longitudinal slot therein, and a stud on said link slidably and pivotally coacting with said slot so that the longitudinal position of said clamp relative to said link may be changed by rotating said adjustable member.

12. The combination with a cylindrical clamp for the seat plate of a reel, of toggle means for longitudinally moving said clamp into and out of engagement with an end of the reel seat plate, and means for accurately adjusting the longitudinal position of said clamp relative to said clamp moving means, said adjusting means comprising a manually adjustable nut threaded on said clamp and longitudinally connected to said clamp moving means.

13. The combination with a clamp for the seat plate of a reel, of toggle means for longitudinally moving said clamp into and out of engagement with the reel seat plate, and means for accurately adjusting the longitudinal position of said clamp relative to said clamp moving means, said adjusting means comprising manually adjustable means threaded to said clamp and longitudinally connected to said toggle means.

SAMUEL G. RUSSELL.